(12) United States Patent
Kimball et al.

(10) Patent No.: US 11,543,064 B2
(45) Date of Patent: Jan. 3, 2023

(54) CONTINUOUS FIBER REINFORCED COMPOSITE AND METAL ELECTROFUSION COUPLER

(71) Applicant: Trelleborg Sealing Solutions Germany GmbH, Stuttgart (DE)

(72) Inventors: Brett Kimball, Loudonville, NY (US); David E. Hauber, Troy, NY (US)

(73) Assignee: Trelleborg Sealing Solutions Germany GmbH, Stuttgart (DE)

(*) Notice: Subject to any disclaimer, the term of this patent is extended or adjusted under 35 U.S.C. 154(b) by 943 days.

(21) Appl. No.: 16/175,018

(22) Filed: Oct. 30, 2018

(65) Prior Publication Data
US 2019/0128458 A1 May 2, 2019

Related U.S. Application Data

(60) Provisional application No. 62/579,387, filed on Oct. 31, 2017.

(51) Int. Cl.
*F16L 47/03* (2006.01)
*B29C 65/56* (2006.01)
(Continued)

(52) U.S. Cl.
CPC ............ *F16L 47/03* (2013.01); *B29C 65/342* (2013.01); *B29C 65/3468* (2013.01); *B29C 65/3476* (2013.01); *B29C 65/561* (2013.01); *B29C 65/562* (2013.01); *B29C 65/72* (2013.01); *B29C 66/1122* (2013.01); *B29C 66/124* (2013.01); *B29C 66/522* (2013.01); *B29C 66/5221* (2013.01); *B29C 66/52295* (2013.01); *B29C 66/52298* (2013.01); *B29C 66/636* (2013.01);
(Continued)

(58) Field of Classification Search
CPC ....... B29C 65/22; B29C 65/562; F16L 41/021
See application file for complete search history.

(56) References Cited

U.S. PATENT DOCUMENTS 4,213,641 A 7/1980 Bennett
4,248,460 A 2/1981 Murray et al.
(Continued)

FOREIGN PATENT DOCUMENTS

| DE | 9319910 U1 * | 3/1994 | .............. F16L 47/02 |
| DE | 29706501 U1 * | 10/1997 | ........... B29C 66/712 |
| EP | 0693652 A2 * | 1/1996 | ........... B29C 66/723 |

*Primary Examiner* — Zachary T Dragicevich
*Assistant Examiner* — James A Linford
(74) *Attorney, Agent, or Firm* — Hackler Daghighian Martino & Novak

(57) ABSTRACT

Disclosed embodiments provide an electrofusion pipe coupler with mechanical support. The electrofusion pipe coupler comprises a coupler housing. A wire is configured and disposed within the housing. Electrodes are affixed to the coupler housing and in electrical contact with the wire. A threaded pattern is formed in an outer surface of the coupler housing. Gripping wedges are affixed to the coupler housing. Each gripping wedge extends from the coupler housing. A nut is attached to the coupler housing, engaging with the threaded pattern, and compressing the wedges against the connecting pipes. This serves to provide axial load transfer from the connecting pipes to the coupler housing via the wedges, thereby providing improved mechanical stability for such pipe assemblies.

22 Claims, 11 Drawing Sheets

(51) Int. Cl.
*B29C 65/00* (2006.01)
*B29C 65/34* (2006.01)
*B29C 65/72* (2006.01)
*B29L 23/00* (2006.01)
*F16L 41/02* (2006.01)
*B29K 701/12* (2006.01)
*F16L 43/00* (2006.01)

(52) U.S. Cl.
CPC ............ *B29C 66/71* (2013.01); *B29C 66/723* (2013.01); *B29C 66/7212* (2013.01); *B29C 66/72141* (2013.01); *B29C 66/7392* (2013.01); *B29C 66/7394* (2013.01); *B29C 66/73921* (2013.01); *B29C 65/348* (2013.01); *B29C 66/5224* (2013.01); *B29C 66/52231* (2013.01); *B29C 66/52241* (2013.01); *B29C 66/72321* (2013.01); *B29K 2701/12* (2013.01); *B29L 2023/22* (2013.01); *F16L 41/021* (2013.01); *F16L 41/023* (2013.01); *F16L 43/008* (2013.01)

(56) References Cited

U.S. PATENT DOCUMENTS

| | | |
|---|---|---|
| 4,770,442 A | 9/1988 | Sichler |
| 4,875,710 A | 10/1989 | Mercado |
| 5,775,736 A | 7/1998 | Svetlik |
| 5,824,179 A | 10/1998 | Greig |
| 6,164,702 A | 12/2000 | Hauber et al. |
| 6,478,668 B2 | 11/2002 | Visser et al. |
| 6,680,464 B1* | 1/2004 | Carter, Jr. ............... F16L 47/03 156/274.2 |
| 7,063,118 B2 | 6/2006 | Hauber et al. |
| 8,110,741 B2 | 2/2012 | Brotzell et al. |
| 2003/0197380 A1* | 10/2003 | Chelchowski ........ F16L 19/065 285/354 |
| 2006/0001259 A1* | 1/2006 | Carter, Jr. ............. B29C 65/561 285/21.2 |
| 2015/0008662 A1* | 1/2015 | Schmidt ............... B29C 65/7855 285/21.2 |

* cited by examiner

CONTINUOUS FIBER REINFORCED COMPOSITE AND METAL ELECTROFUSION COUPLER

CROSS REFERENCE TO RELATED APPLICATIONS

This application claims priority to U.S. Patent Application Ser. No. 62/579,387, filed on Oct. 31, 2017, the entire contents of which are incorporated herein by reference.

FIELD

The present invention relates generally to pipe joining equipment, and more particularly, to a continuous fiber reinforced composite and metal electrofusion coupler.

BACKGROUND

Electrofusion is a technique for joining thermoplastic pipes, such as where valves, elbows, and tees must be added. Prefabricated fittings are used, incorporating an electrical heating coil which melts the plastic of both the fitting and the pipe, causing them to fuse together. While electrofusion has various advantages, there are also some shortcomings. Pipe joints manufactured via existing electrofusion methods are limited by the inability to join thermoset pipe, the inability to join unbonded reinforced thermoplastic pipe (RTP), a low shear strength of bonded plastic compared to axial loads in pipes, and a low burst pressure of short fiber reinforced composite or neat thermoplastic. Therefore, it is desirable to have improvements in pipe joining techniques and equipment.

SUMMARY

Embodiments provide an electrofusion pipe coupler, comprising: a coupler housing; a wire configured and disposed within the housing; a plurality of electrodes affixed to the coupler housing and in electrical contact with the wire; a threaded outer surface on the coupler housing; a plurality of gripping wedges affixed to the coupler housing, wherein each gripping wedge extends from the coupler housing; and a nut mechanically engaged by threads to the coupler housing.

In some embodiments, the wire is comprised of nickel.

In some embodiments, the wire is coated with high-density polyethylene.

In some embodiments, the coupler housing is comprised of steel.

In some embodiments, the plurality of electrodes is comprised of brass.

In some embodiments, the pipe coupler is a linear pipe coupler.

In some embodiments, the pipe coupler is an elbow pipe coupler.

In some embodiments, the pipe coupler is a Y pipe coupler.

In some embodiments, the pipe coupler is a tee pipe coupler.

In some embodiments, a fiberglass or carbon fiber based composite insert is disposed within the coupler housing.

Additional embodiments include an electrofusion pipe coupler comprising: a coupler housing; a wire configured and disposed within the coupler housing; a first electrode and a second electrode, each affixed to the coupler housing and in electrical contact with the wire; a threaded outer surface on the coupler housing; and a plurality of gripping wedges affixed to the coupler housing, wherein each gripping wedge extends from the coupler housing; a first nut mechanically engaged by threads to the coupler housing, wherein the first nut comprises an access hole formed within a sidewall of the first nut, and wherein the first nut is aligned with the first electrode; and a second nut mechanically engaged by threads to the coupler housing that applies gripping force from the wedges to a connected pipe, wherein the second nut comprises an access hole formed within a sidewall of the second nut, and wherein the second nut is aligned with the second electrode.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering may represent like elements.

DETAILED DESCRIPTION

Figure 1:
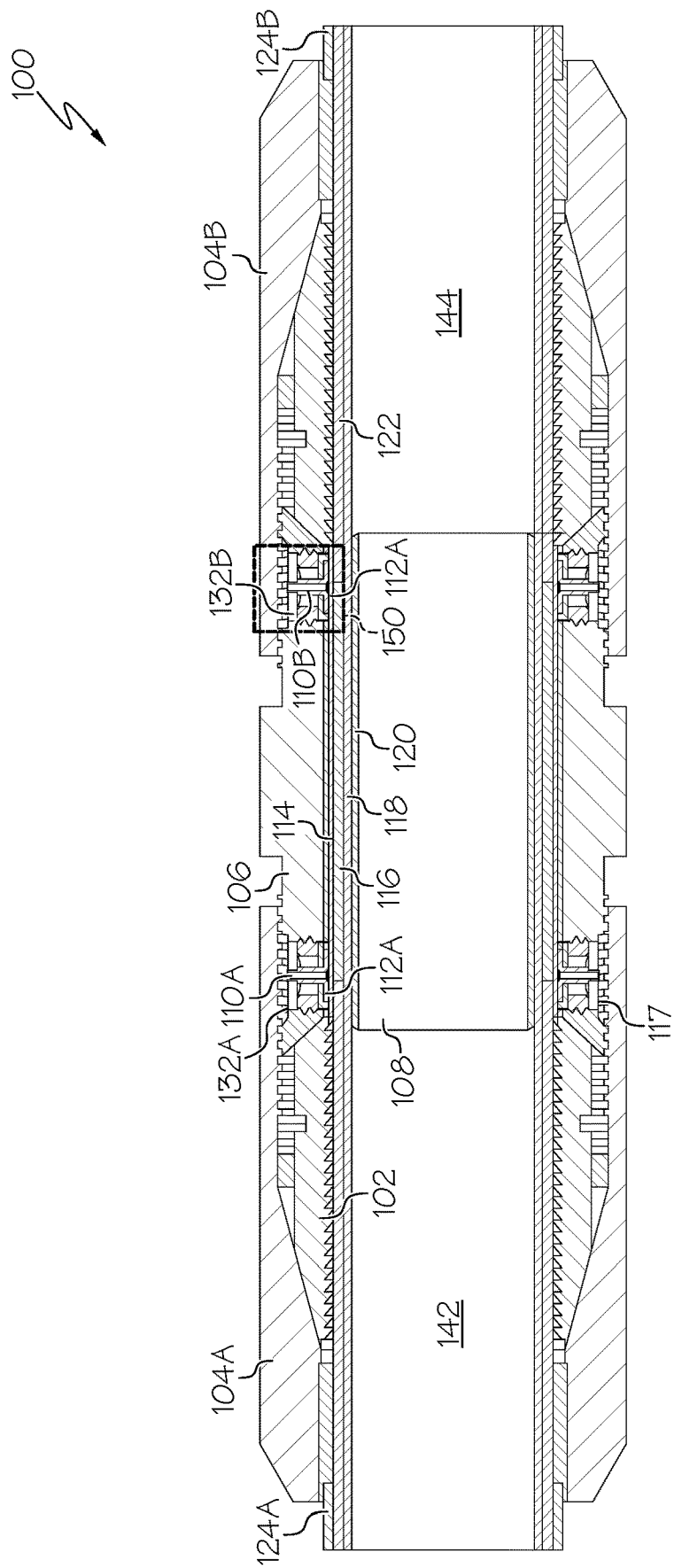
FIG. 1 shows a cross-section view of an embodiment of the present invention.

The low strength of traditional electrofusion couplers, plus unreliability of metallic components and elastomeric seals over multiple decades, creates a need for a pipe joining system and method without elastomeric seals that does not leak gas or liquid, but withstands burst pressure and other mechanical loads induced during its installation, such as axial loading. Embodiments of the present invention address these concerns for a wide variety of composite pipes including thermoset, thermoplastic, unbonded, and bonded types.

Disclosed embodiments can be used to produce multi-material couplers and fittings, made of metal and continuous fiber reinforced thermoplastic matrix composite for use on composite pipes. Fiber reinforcement is applicable to technologies including, but not limited to, glass (E and S type), carbon, aramid (and other polymer fibers as long as the coupler service temperature is less than the glass transition temperature of the polymer fibers), ceramic, and metal. Thermoplastic matrix materials include, but are not limited to, PE (Polyethylene including high density PE and medium density PE), PP (polypropylene), PPS (polyphenelyene sulphide), PEEK (polyetheretherkeytone), PEK (polyetherketone), PEKK (polyetherketoneketone), PA (polyamide), PAI (polyamide-imide), PI (polyimide), and PVDF (polyvinylidene fluoride). The pipe, pipe couplings, and pipe fittings can be used to convey fluids which include, but are not limited to, liquids such as potable water, waste water, oil, petrochemicals, acids, bases, and gases such as natural gas and hydrogen.

A pipe coupler comprised of multiple composite and metallic materials is disclosed, allowing pipe joining, via electrofusion bonding, of thermoset or thermoplastic based bonded or unbonded pipe. The coupler comprises a series of concentric cylindrical components. In some embodiments, an HDPE (high-density polyethylene) pipe liner is disposed around an outer surface of a fiberglass or carbon fiber based composite insert. A wire is disposed on the outer surface of the pipe liner. Electrodes are affixed to the coupler housing and in electrical contact with the wire. A neat HDPE layer is disposed over the wire. A coupler housing surrounds the neat HDPE layer.

In some embodiments, the pipe is comprised of an inner neat (unreinforced) thermoplastic polymer liner, with a bonded continuous reinforced thermoset composite structural layer that is disposed over the thermoplastic polymer liner, and a neat unbonded thermoplastic outer sheath disposed on an outer surface of the bonded continuous reinforced thermoset composite structural layer. As part of an assembly process, the neat thermoplastic polymer liner of a pipe to be joined by the coupler of disclosed embodiments is exposed by machining and removing the structural composite layer and outer sheath at the area of the coupler. An end of each of two pipes are inserted into the thermoplastic coated wire coil, made via automated fiber placement. The wire terminations are routed radially through insulated electrodes and mechanically fastened in place to the coupler housing. An electrofusion machine can be connected to these electrodes to apply an electric current, causing the materials to bond together, forming a seal. In some embodiments, the resistance of the coupler may range from two Ohms to 14 Ohms. In some embodiments, the power applied may range from 350 watts to 800 watts for a duration ranging from 60 seconds to 240 seconds at a voltage ranging from 40 volts to 110 volts. These values are exemplary, and other feasible values are included within the scope of embodiments of the present invention.

Beyond the fusion area, axisymmetric split mechanical grips (wedges) apply a normal force into the pipes via a nut which screws onto the coupler housing. This grip and nut feature is applied symmetrically about the centerline of the housing, to both pipes entering the coupler. Axial load transfers from the structural layer of the pipe, through friction applied at the grips, into the grips, into the nut, then into the central housing, and is symmetric about the central housing's centerline. An internal sleeve is fitted inside the wire coil before joining the pipes, to provide radial pressure during electrofusion. A traditional electrofusion process seals the pipe from internal fluid leaking. This same concept could be applied with a coupler or a fitting where a coupler is defined as joining two pipes and a fitting joins single or multiple pipes such as a flange, T, Y, or other configurations. Other composite pipes such as unbonded or bonded RTP, unbonded thermoset and other types can be joined using this innovative coupler.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

Figure 2:
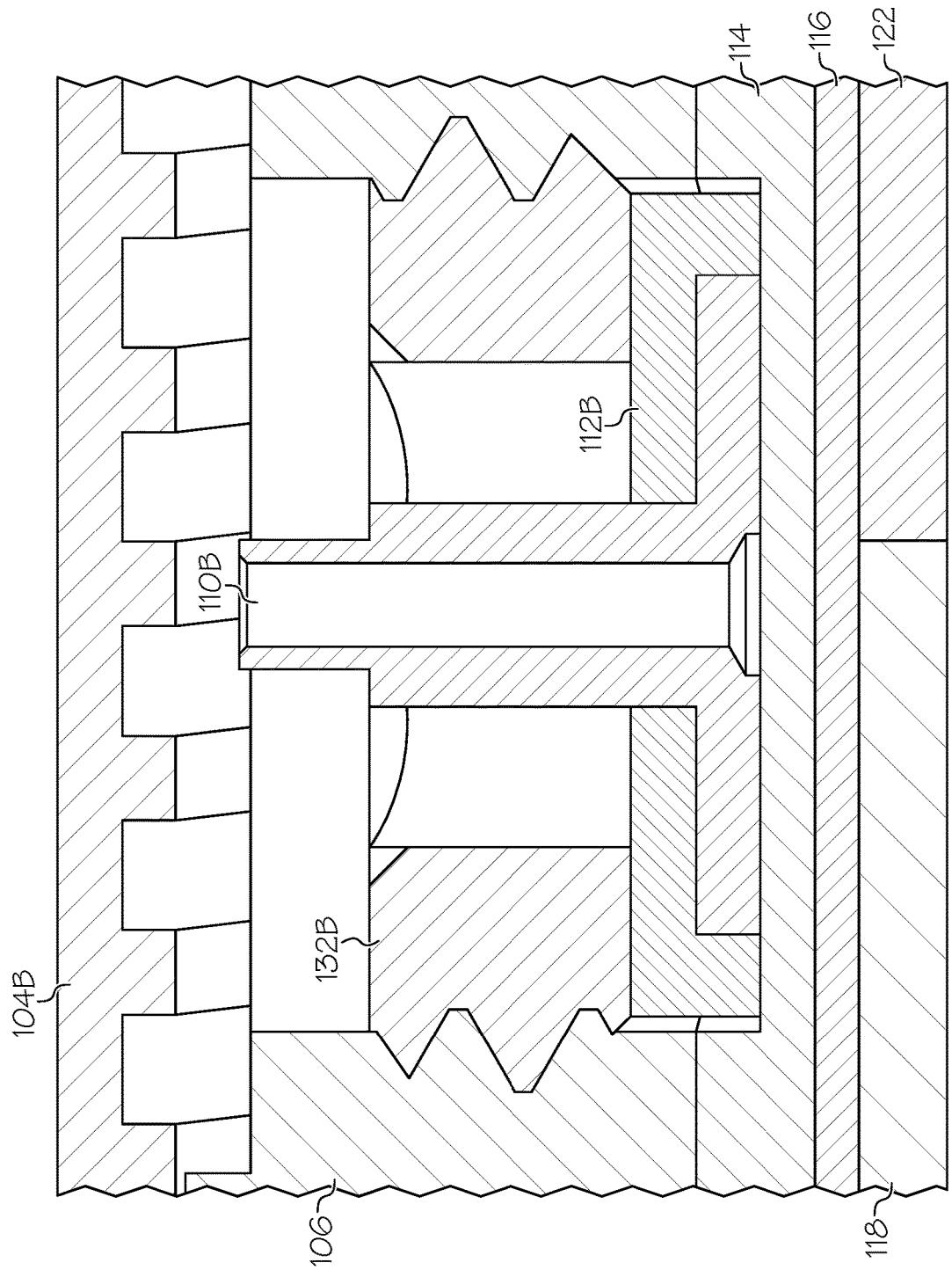
FIG. 2 shows details of an area of FIG. 1.

FIG. 1 shows a cross-section view of an embodiment of a coupler 100 of embodiments of the present invention. FIG. 2 shows details of area 150 of FIG. 1. Two pipes (142 and 144) are joined at a fiberglass or carbon fiber based composite insert 108, in accordance with embodiments of the present invention. The pipes may have an outer surface 122 comprised of fiberglass and wet wound epoxy, or other suitable material. The coupler 100 comprises a variety of components for supporting electrofusion. The coupler 100 includes a wire 118. In embodiments, the wire 118 is comprised of metal such as nickel, copper, nichrome, or any other suitable electrically conducting material. In some embodiments, wire 118 is an HDPE (high-density polyethylene) coated nickel wire.

Wire 118 is electrically connected to two electrodes 110A and 110B that are formed within a coupler housing 106. As part of a pipe assembly processes, a current is applied to the electrodes 110A and 110B. This current heats wire 118, causing melting and fusing of various layers within the coupling to form an integral seal. In some embodiments, the electrodes 110A and 110B, are comprised of brass. The electrodes 110A and 110B are surrounded by a plastic insulator 112A and 112B, respectively, to prevent undesired shorting. The electrodes 110A and 110B, are each secured in place by a respective electrode setting nut 132A and 132B.

An E-glass/PE Composite layer 114 is disposed over a neat HDPE layer 116, which is disposed over wire 118. The wire 118 is disposed over an HDPE pipe liner 120. When a current is applied to the electrodes 110A and 110B from an electrofusion machine or other suitable external power source, the resultant heat causes the layers 114, 116, and 120 to fuse together, forming an integral seal for the pipe coupler 100. Extending from each end of the coupler 100 are a plurality of gripping wedges 102. In some embodiments, each end has three gripping wedges. In other embodiments, more or fewer gripping wedges may be used. In embodiments, the wedges may be comprised of metal such as steel, stainless steel, ceramics, or any other suitable material with sufficiently high modulus compared to composite pipe. The relatively high modulus ensures the wedge teeth bite into the structural composite pipe layer, and ensure effective load transfer consistently across wedge length and circumference. Wedges may be kept in place, before nut is assembled, with an elastomeric O-ring, placed in a circumferential groove on the outer radius of each wedge.

Coupler housing 106 has a threaded pattern 117 on its exterior surface. In some embodiments, after the electrofusion process has been performed, and the fused materials have set, each side is fitted with a nut, shown as nut 104A and nut 104B. The nuts 104A and 104B engage with the threads of threaded surface 117. As the nuts 104A and 104B are tightened onto the threaded surface 117, a force on the nuts 104A and 104B is applied towards the direction of the fiberglass/epoxy pipe surface 122. This mechanical force pushes the wedges 102 against the fiberglass/epoxy pipe surface 122 to transfer axial loads. Thus, embodiments of the present invention serve to provide axial load transfer from the connecting pipes to the coupler housing 106 via the wedges. In this way, an improved electrofusion technique is possible, providing the convenient assembly and integral seal qualities of electrofusion with the benefits of mechanical coupling for a robust structure. In some embodiments, an electrical resistance measurement may be performed on the wire 118 to determine a safe time for affixing the nuts 104A and 104B to the threaded surface 117. In practice, it is desirable to allow the composite materials to cool sufficiently before applying the nuts. A resistance measurement may be used to determine this condition. There is a relationship between resistance and temperature. Thus, when the resistance falls to a predetermined level, it may be deemed as a safe condition for affixing the nuts. In embodiments, the predetermined level may be empirically derived. Some embodiments may include an HDPE unbonded jacket 124A and 124B disposed at the ends of the coupler for additional stability.

Figure 3:
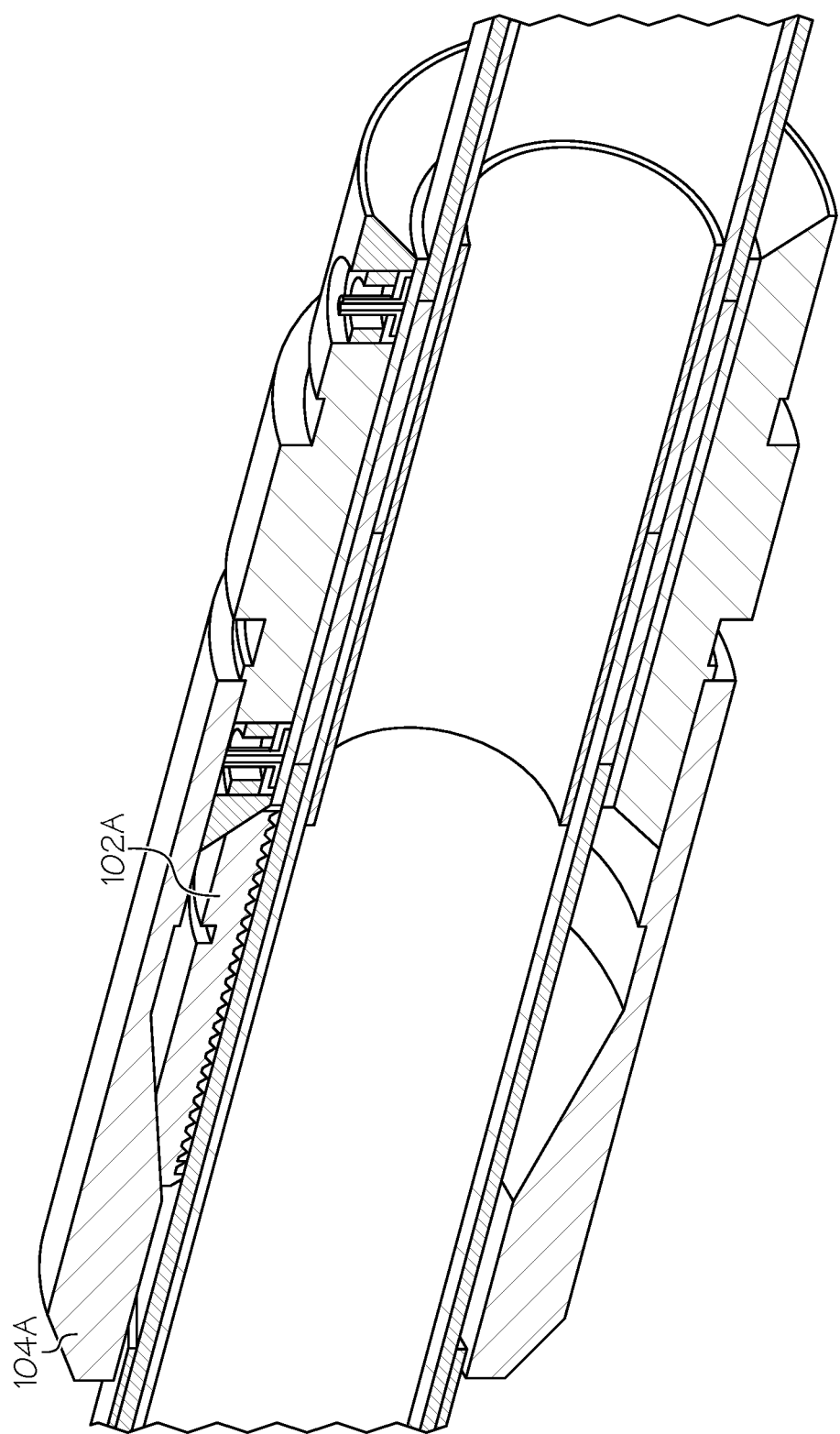
FIG. 3 shows another cross-section view of an embodiment of the present invention.

FIG. 3 shows another cross-section view of an embodiment of the present invention. In this view, the nut 104A is shown pressing against wedge 102A. This provides axial load transfer from the connecting pipes to the coupler housing 106 via the wedges.

Figure 4:
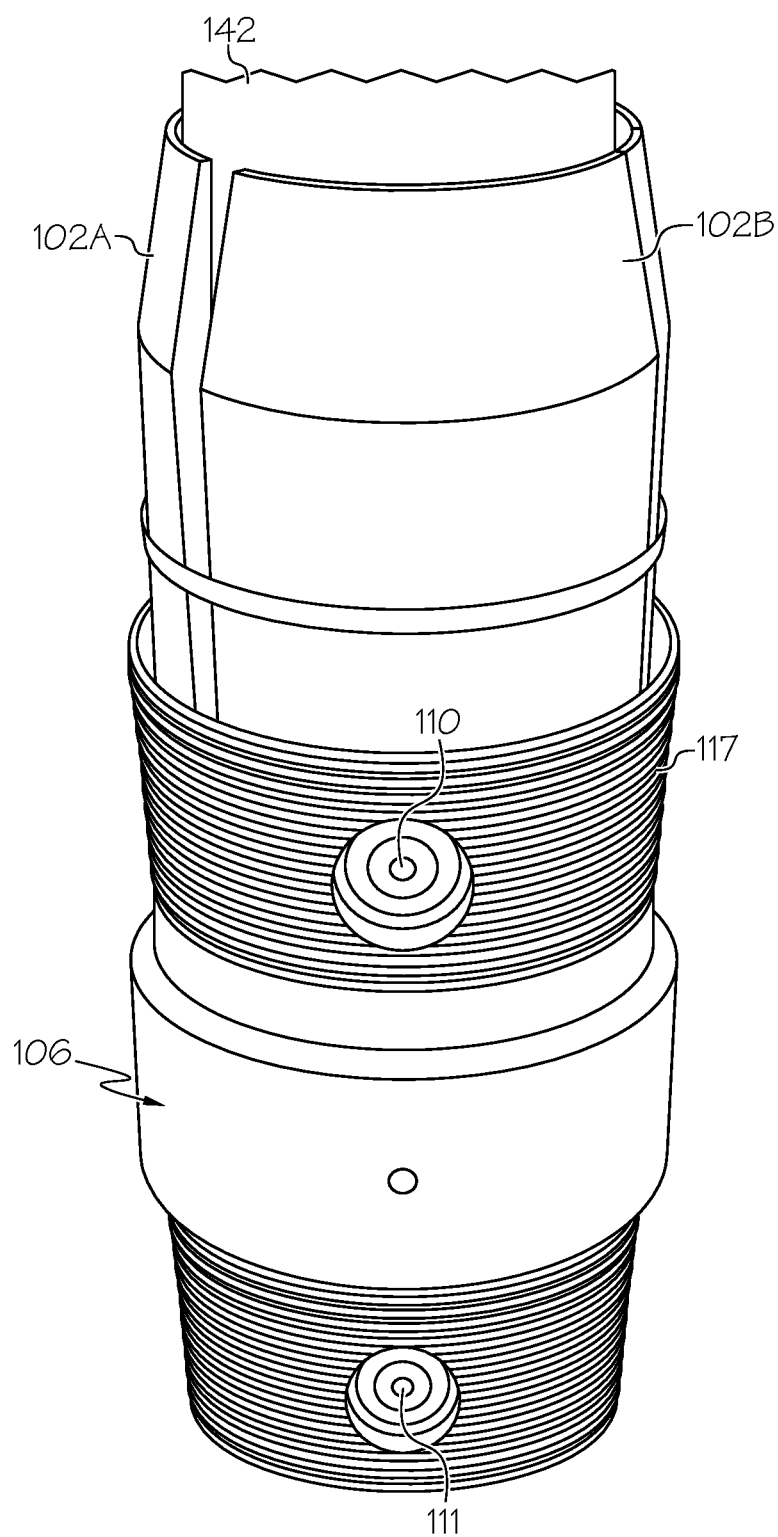
FIG. 4 illustrates a partially assembled coupling in accordance with embodiments of the present invention.

FIG. 4 illustrates a partially assembled coupling of pipes in accordance with embodiments of the present invention. The coupler housing 106 comprises a threaded surface 117. In some embodiments, the coupler housing 106 is comprised of steel, or other suitable materials. A plurality of wedges, examples of which are indicated as 102A and 102B (referred to in the plural forms as "102"), are mechanically coupled to the coupler housing 106. A pipe 142 is inserted into the coupler housing 106 such that the wedges are disposed on an exterior surface of pipe 142. A nut (not shown in FIG. 4 but illustrated as 104A, as well as 104B, in FIG. 1) is then tightened by mechanically engaging with threaded surface 117. This presses the wedges 102 against the pipe 142. A similar process occurs on the other side of the coupler housing 106 with a different pipe, enabling the joining of two pipes by applying an electric current to electrodes 110A and 110B. Embodiments can include a linear coupler as shown in FIG. 4. Other embodiments may include, but are not limited to, a tee connector, an elbow connector, a Y connector, or other suitable connector.

Figure 5:
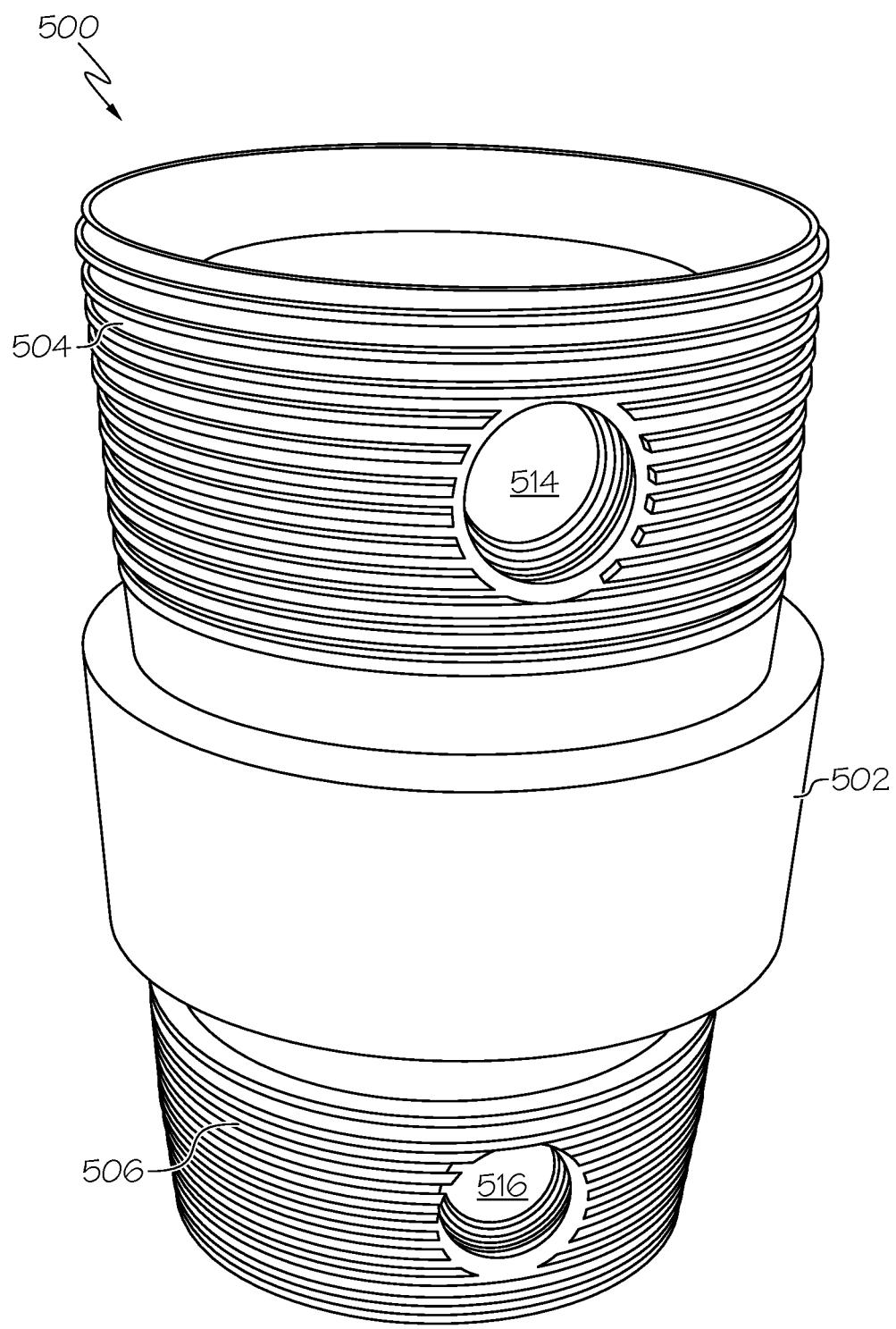
FIG. 5 shows a coupler housing in accordance with embodiments of the present invention.

FIG. 5 shows a coupler housing 500 in accordance with an embodiment of the present invention. This coupler housing is similar to that shown as 106 in FIG. 4, but illustrated without the electrodes (110A and 110B of FIG. 1), revealing the electrode ports 514 and 516 where the electrodes get installed. Coupler housing 500 comprises a main body 502, and a threaded portion 504 and 506 on each end of the coupler housing 500. The electrode port 514 is formed within the threaded portion (surface) 504. Similarly, the electrode port 516 is formed in the threaded portion 506. The electrode ports 514 and 516 are threaded holes formed in the sidewall of the coupler housing 500 to enable the electrodes to protrude out through the electrode ports.

Figure 6:
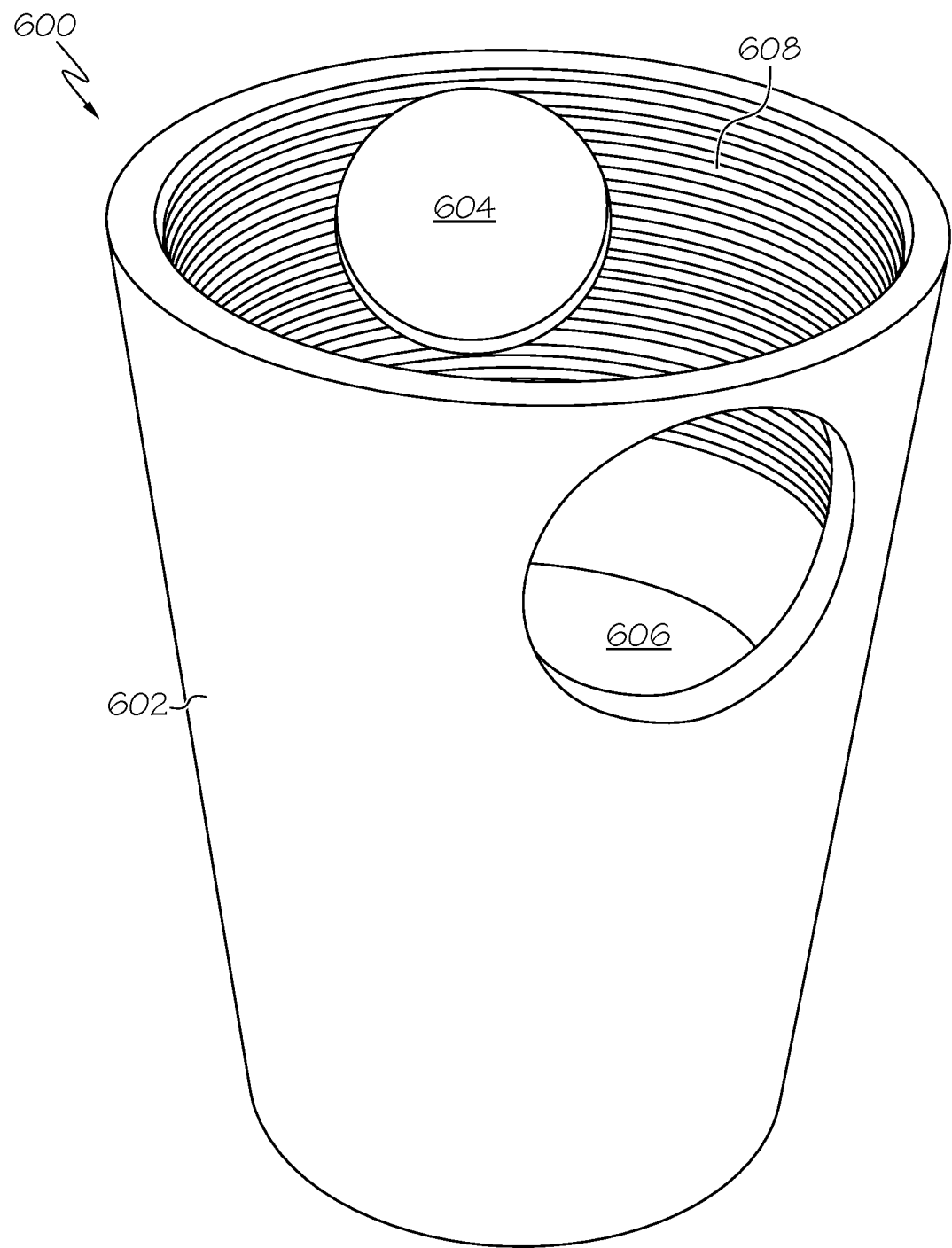
FIG. 6 shows a nut in accordance with embodiments of the present invention.

FIG. 6 shows a nut 600 in accordance with the embodiment of FIG. 5. One nut 600 is used on each side of the coupler housing 500. One nut 600 is threaded on to threaded portion 504, and another similar nut 600 is threaded onto threaded portion 506. The nut 600 is mechanically engaged by threads 608 to the coupler housing and applies gripping force from the wedges to a connected pipe.

The nut 600 includes two access holes, indicated as 604 and 606, that are formed within the sidewall 602 of the nut. In use, the nuts are threaded onto the threaded portion of the coupler housing such that one of the two access holes aligns with an electrode port 514 or 516. This innovative approach enables the nuts to be secured onto the coupler housing prior to applying current to the electrodes. The electrode ports and access holes enable the electrical current to be applied while the nuts are in place. This enables the coupler to be secured, limiting expansion and contraction of thermoplastic materials, which can serve to improve the quality and integrity of the bond between the two pipes.

Figure 7:
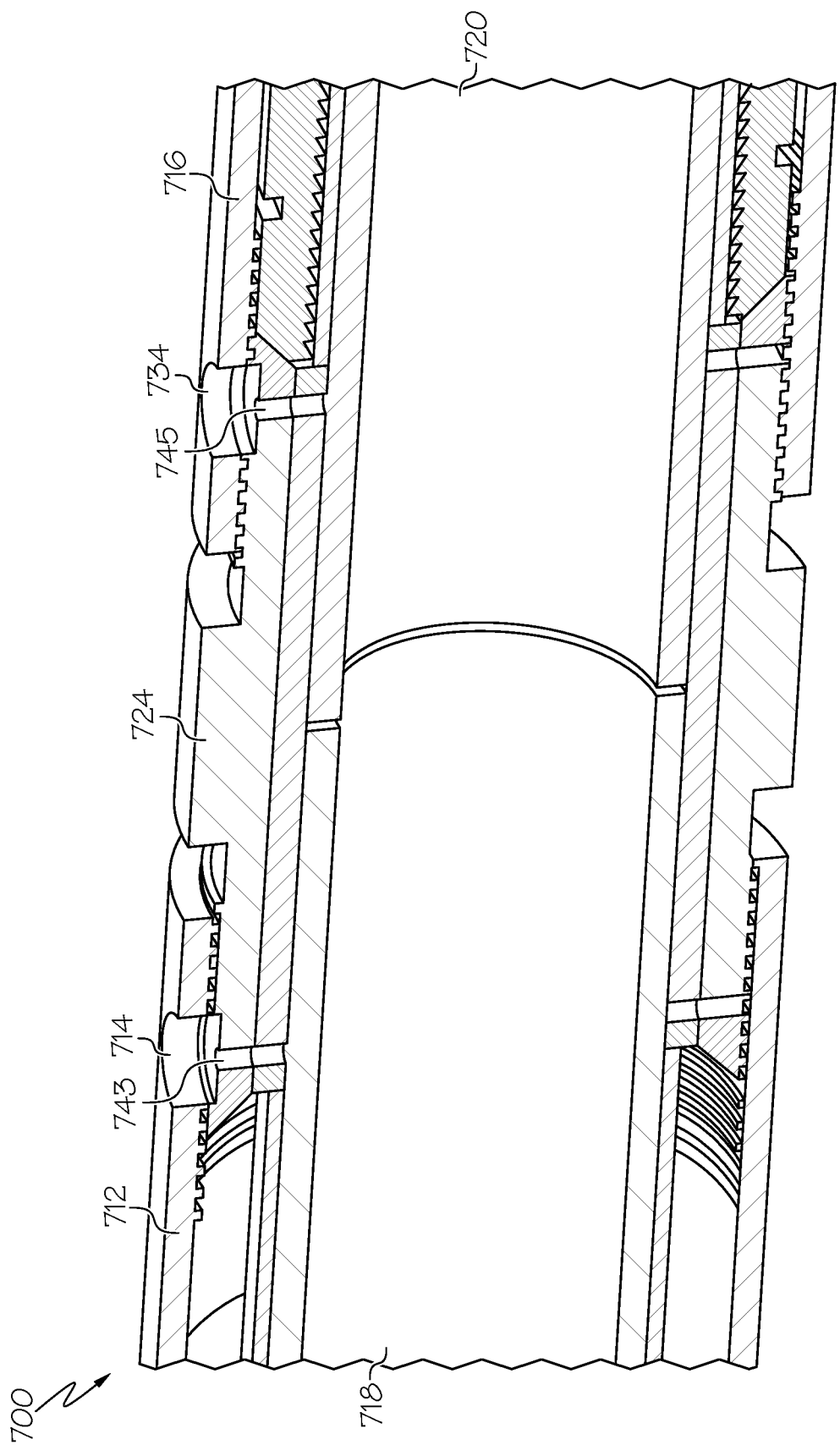
FIG. 7 shows a cross-section view of an additional embodiment of the present invention.

FIG. 7 shows a cross-section view of an additional embodiment 700 of the present invention. A first pipe 718 and second pipe 720 are joined by inserting them into the coupler housing 724. Coupler housing 724 is similar to coupler housing 500 of FIG. 5, and includes electrodes 743 and 745, respectively. A first nut 712 is threaded onto one side of the coupler housing 724. A second nut 716 is threaded onto the opposite side of the coupler housing 724. First nut 712 has access hole 714 that is aligned with the electrode 743. Second nut 716 has access hole 734 that is aligned with the electrode 745. To join the pipes together, a current is applied to electrodes 743 and 745. The operation is similar to that described for FIG. 1, with a difference being the configuration of the coupler housing 724 and corresponding nuts 712 and 716 that have access holes to allow access to the electrodes after the nuts 712 and 716 are secured in place. This enables the electric current to be applied to the electrodes while the pipes are constrained by the nuts and the coupler housing, limiting the amount of expansion, and improving the quality of the pipe joint.

FIG. 1 and FIG. 7 show examples of linear pipe couplers. However, pipe couplers of disclosed embodiments can include other types, such as Y, tee, elbow, or other connectors.

Figure 8A:
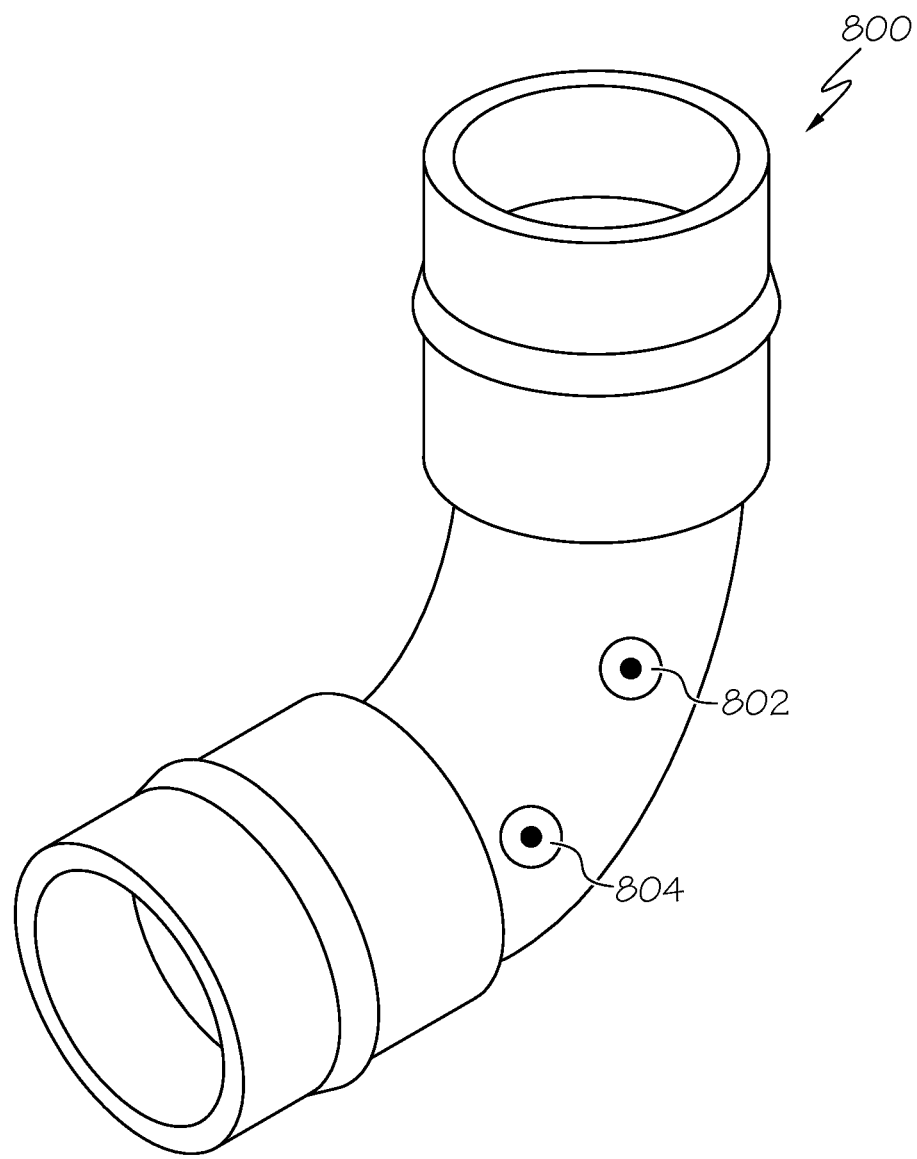
FIG. 8A shows an example of an elbow pipe coupler in accordance with embodiments of the present invention.

FIG. 8A shows an example of an elbow pipe coupler 800 in accordance with embodiments of the present invention. Elbow pipe coupler 800 includes a first electrode 802 and a second electrode 804 for applying a current to form a joint between two thermoplastic pipes. Elbow pipe coupler 800 further includes elements of embodiments of the invention described herein.

Figure 8B:
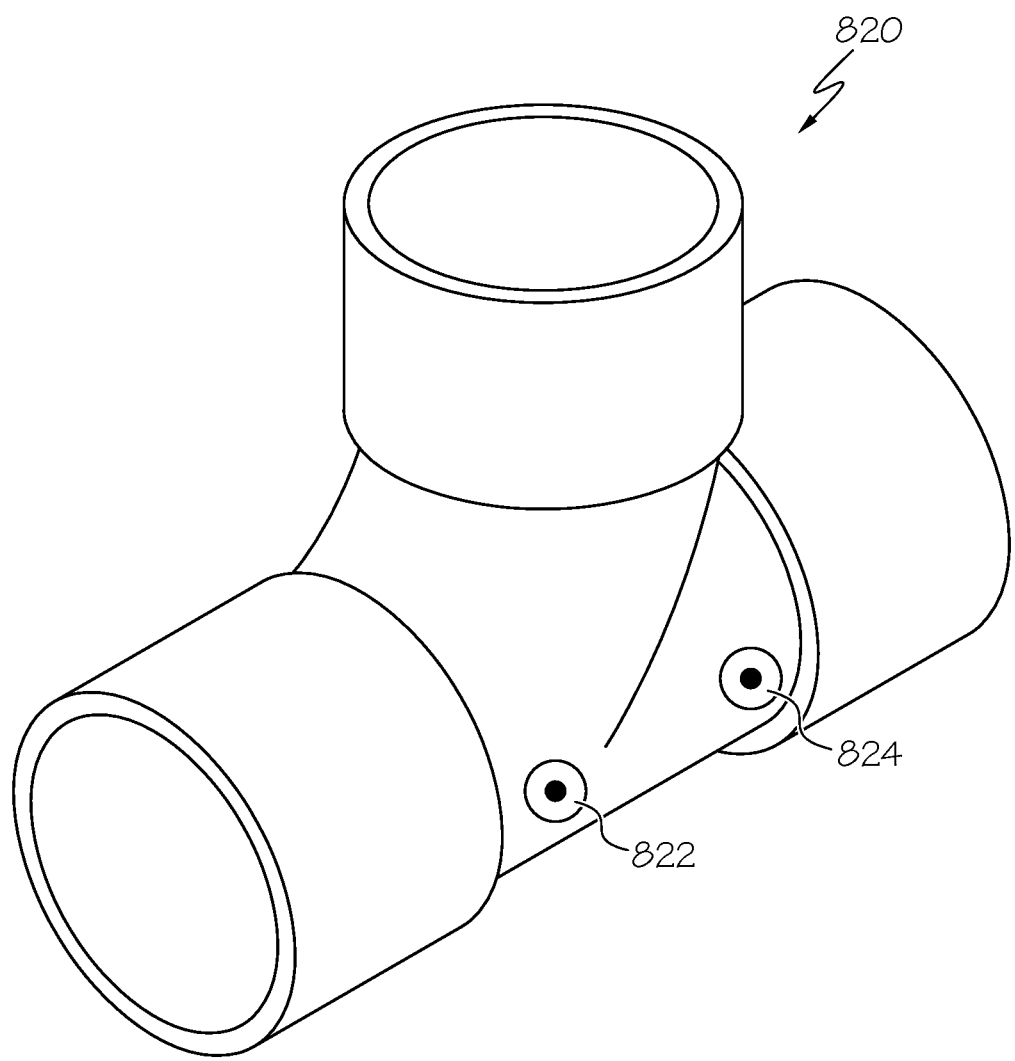
FIG. 8B shows an example of a tee pipe coupler in accordance with embodiments of the present invention.

FIG. 8B shows an example of a tee pipe coupler 820 in accordance with embodiments of the present invention. Tee pipe coupler 820 includes a first electrode 822 and a second electrode 824 for applying a current to form a joint between two thermoplastic pipes. Elbow pipe coupler 820 further includes elements of embodiments of the invention described herein.

Figure 8C:
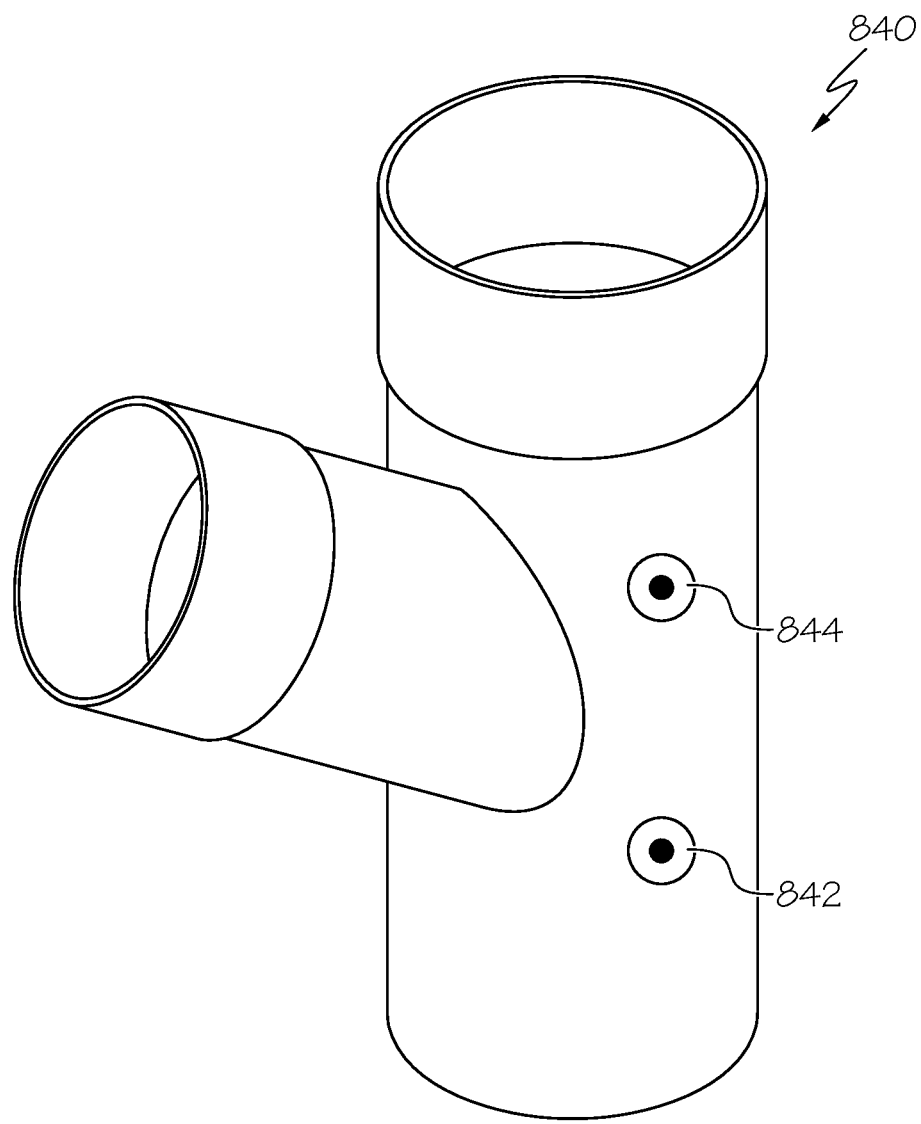
FIG. 8C shows an example of a Y pipe coupler in accordance with embodiments of the present invention.

FIG. 8C shows an example of a Y pipe coupler in accordance with embodiments of the present invention. Y pipe coupler 840 includes a first electrode 842 and a second electrode 844 for applying a current to form a joint between two thermoplastic pipes. Elbow pipe coupler 840 further includes elements of embodiments of the invention described herein.

Figure 9:
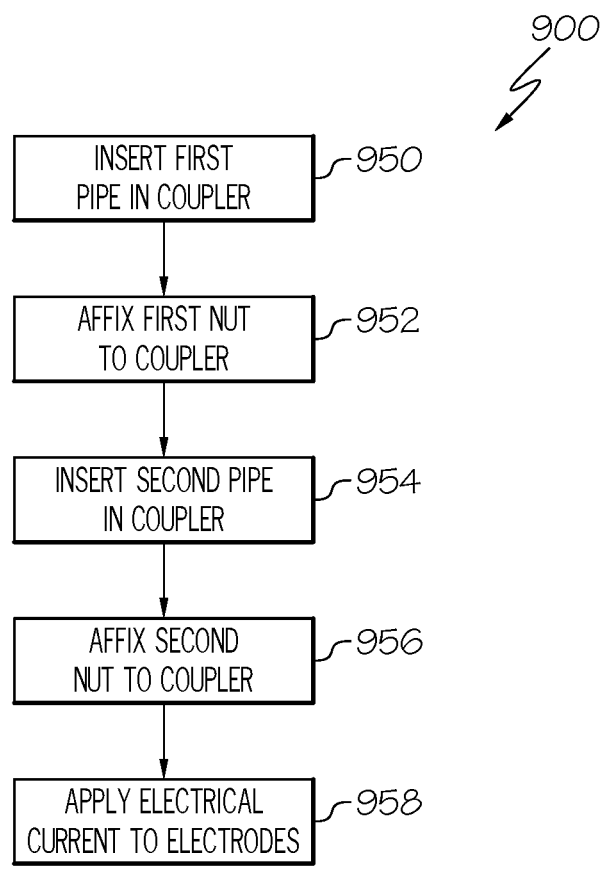
FIG. 9 is a flowchart showing process steps for embodiments of the present invention.

FIG. 9 is a flowchart indicating process steps for embodiments of the present invention. At 950, a first pipe is inserted into a pipe coupler of disclosed embodiments. At 952, a first nut is affixed to the coupler such that one of the alignment holes of the first nut aligns with a corresponding electrode of the pipe coupler. At 954, a second pipe is inserted into a pipe coupler of disclosed embodiments. At 956, a second nut is affixed to the coupler such that one of the alignment holes of the second nut aligns with the corresponding electrode of the pipe coupler. At 958, an electric current is applied to the electrodes to heat the materials to form the joint between the two pipes. Some embodiments may have more or fewer steps. In some embodiments, one or more steps may be performed concurrently.

As can now be appreciated, disclosed embodiments provide improvements in joining of thermoplastic pipes. Embodiments of the coupler provide access to the electrodes after the coupler and corresponding nuts are in place. This limits expansion and contraction of thermoplastic materials during the joining process, which can improve the quality of the joined pipes.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An electrofusion pipe coupler, comprising:
a coupler housing;
a wire configured and disposed within the coupler housing;
a plurality of electrodes affixed to the coupler housing and in electrical contact with the wire;
a threaded outer surface on the coupler housing;
a plurality of gripping wedges; and
a nut mechanically engaged by threads to the coupler housing;
wherein the plurality of gripping wedges are disposed on an inside of the nut and captured between the nut and an end of the coupler housing;
wherein the coupler housing, the wire, each gripping wedge of the plurality of gripping wedges and the nut are separately formed parts.

2. The pipe coupler of claim 1, wherein the wire is comprised of nickel.

3. The pipe coupler of claim 2, wherein the wire is coated with high-density polyethylene.

4. The pipe coupler of claim 1, wherein the coupler housing is comprised of steel.

5. The pipe coupler of claim 1, wherein the plurality of electrodes are comprised of brass.

6. The pipe coupler of claim 1, wherein the pipe coupler is a linear pipe coupler.

7. The pipe coupler of claim 1, wherein the pipe coupler is an elbow pipe coupler.

8. The pipe coupler of claim 1, wherein the pipe coupler is a Y pipe coupler.

9. The pipe coupler of claim 1, wherein the pipe coupler is a tee pipe coupler.

10. The pipe coupler of claim 1, further comprising a fiberglass composite insert disposed within the coupler housing.

11. An electrofusion pipe coupler, comprising:
a coupler housing;
a wire configured and disposed within the coupler housing;
a first electrode and a second electrode, each affixed to the coupler housing and in electrical contact with the wire;
a threaded outer surface on the coupler housing; and
a plurality of gripping wedges;
a first nut mechanically engaged by the threaded outer surface on the coupler housing, wherein the first nut comprises an access hole formed within a sidewall of the first nut, and wherein the access hole of the first nut aligns with the first electrode; and
a second nut mechanically engaged by the threaded outer surface on the coupler housing that is configured to apply a gripping force from the plurality of gripping wedges to a connected pipe, wherein the second nut comprises an access hole formed within a sidewall of the second nut, and wherein the access hole of the second nut aligns with the second electrode;
wherein the plurality of gripping wedges are disposed on an inside of the second nut and captured between the second nut and an end of the coupler housing;
wherein the coupler housing, the wire, each gripping wedge of the plurality of gripping wedges, the first nut and the second nut are separately formed parts.

12. The pipe coupler of claim 11, wherein the wire is comprised of nickel.

13. The pipe coupler of claim 12, wherein the wire is coated with high-density polyethylene.

14. The pipe coupler of claim 11, wherein the coupler housing is comprised of steel.

15. The pipe coupler of claim 11, wherein the first electrode and second electrode are comprised of brass.

16. The pipe coupler of claim 11, wherein the pipe coupler is a linear pipe coupler.

17. The pipe coupler of claim 11, wherein the pipe coupler is an elbow pipe coupler.

18. The pipe coupler of claim 11, wherein the pipe coupler is a Y pipe coupler.

19. The pipe coupler of claim 11, wherein the pipe coupler is a tee pipe coupler.

20. An electrofusion pipe coupler configured to join a first pipe to a second pipe, comprising:
a coupler housing having a first end disposed opposite a second end;
a wire disposed within the coupler housing;
a plurality of electrodes affixed to the coupler housing and in electrical contact with the wire;
a first threaded outer surface at the first end of the coupler housing;
a second threaded outer surface at the second end of the coupler housing;
a first plurality of gripping wedges disposed at the first end of the coupler housing;
a second plurality of gripping wedges disposed at the second end of the coupler housing;
a first nut having a first threaded inner surface configured to thread onto the first threaded outer surface of the coupler housing; and
a second nut having a second threaded inner surface configured to thread onto the second threaded outer surface of the coupler housing;

wherein the first plurality of gripping wedges are disposed on a first inside of the first nut and are captured between a first inner surface of the first nut and the first end of the coupler housing; and wherein the second plurality of gripping wedges disposed on a second inside of the second nut and are captured between a second inner surface of the second nut and the second end of the coupler housing;

wherein, when the electrofusion pipe coupler is used to join the first pipe to the second pipe, a first tightening of the first nut relative to the first end of the coupler housing is configured to apply a gripping force towards the coupler housing from the first plurality of gripping wedges onto the first pipe and a second tightening of the second nut relative to the second end of the coupler housing is configured to apply a gripping force towards the couple housing from the second plurality of gripping wedges onto the second pipe;

wherein the coupler housing, the wire, each gripping wedge of the first plurality of gripping wedges, the second plurality of gripping wedges, the first nut and the second nut are separately formed parts.

21. The electrofusion pipe coupler of claim 20, wherein, when the electrofusion pipe coupler is used to join the first pipe to the second pipe, the first inner surface of the first nut is angled forcing the first plurality of gripping wedges into first pipe, and wherein the second inner surface of the second nut is angled forcing the second plurality of gripping wedges into second pipe.

22. The electrofusion pipe coupler of claim 21, wherein, when the electrofusion pipe coupler is used to join the first pipe to the second pipe, the first end of the coupler housing contacting the first plurality of gripping wedges is angled forcing the first plurality of gripping wedges into first pipe, and wherein the second end of the coupler housing contacting the second plurality of gripping wedges is angled forcing the second plurality of gripping wedges into second pipe.

* * * * *